June 10, 1941.  E. BUGATTI  2,244,763
POWER PLANT FOR AIRPLANES
Filed March 16, 1939
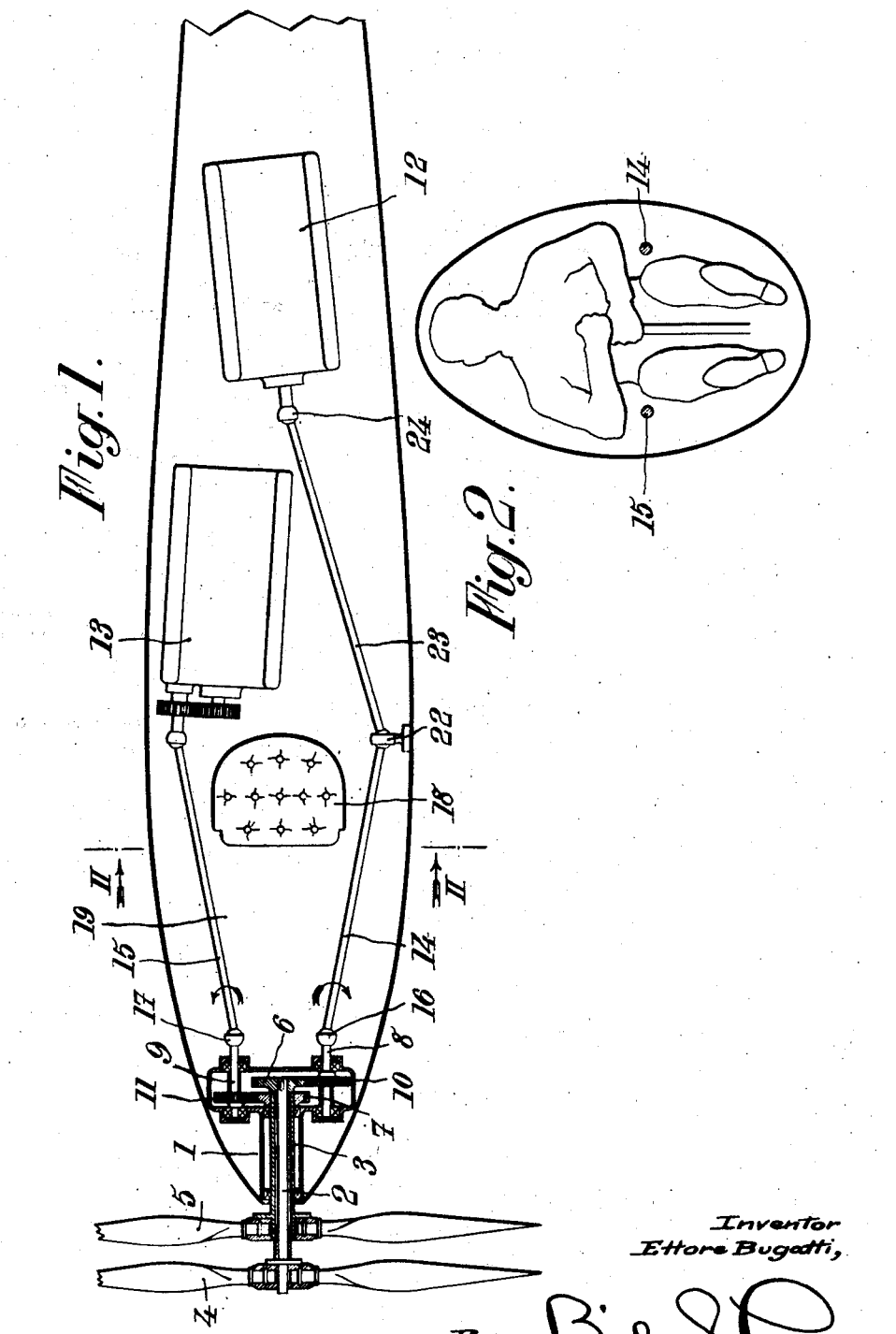
Inventor
Ettore Bugatti,
By Bailey
Attorneys Patented June 10, 1941

2,244,763

UNITED STATES PATENT OFFICE 2,244,763

POWER PLANT FOR AIRPLANES

Ettore Bugatti, Paris, France

Application March 16, 1939, Serial No. 262,269
In Luxemburg March 19, 1938

5 Claims. (Cl. 244—55)

The present invention relates to power plants for aircraft including a plurality of engines.

The object of the invention is to provide a system of this kind which is better adapted to meet the requirement of practice than those used up to the present time.

According to the essential feature of the present invention, the power plant includes two engines each adapted to drive a screw propeller, these two propellers being arranged coaxially with each other at the end of a fuselage and turning in opposed directions, respectively, and these two engines are arranged behind each other in said fuselage and are each coupled with the corresponding propeller shaft, through a transmission shaft including at least one bend provided with a suitable coupling.

Other features of the present invention will result from the following detailed description of some specific embodiments thereof.

A preferred embodiment of the present invention will be hereinafter described, with reference to the accompanying drawing, given merely by way of example, and in which:

Fig. 1 is a horizontal axial section of the fuselage of an airplane provided with two engines arranged according to the invention;

Fig. 2 is a sectional view on the line II—II of Fig. 1.

In the following description, the invention is applied to the case of an airplane provided with two propellers mounted on the nose of the fuselage.

Two propeller shafts 2 and 3 are mounted in suitable bearings fitted in a common frame 1, at the front part of the fuselage.

Each of these propeller shafts is associated on the one hand at its front end with a propeller 4 or 5, and, on the other hand at its rear part with a toothed wheel 6 or 7, the two propellers, and also the two toothed wheels, being arranged immediately behind each other.

I provide, in suitable bearings mounted in frame 1, two intermediate shafts 8 and 9, each of which carries a toothed wheel 10, 11 adapted to mesh with wheels 6 and 7, respectively.

In order to connect each of the intermediate shafts 8, 9 with an independent power plant element 12, 13, I provide a transmission shaft 14, 15, with the interposition of at least one bevel gear or deformable coupling 16, 17.

The two engines 13 and 12 are arranged in the fuselage, one behind the other, at the rear of the pilot's seat 18.

Finally, I arrange the transmission shafts 14, 15 in such manner that they pass on opposite sides of the pilot.

For instance, the shafts may be caused to pass under the elbows of the pilot, so that they can be housed inside an elliptic outline surrounding the body of the pilot, whereby the cross section of the fuselage is reduced to a minimum.

Advantageously, the transmission shafts are arranged as shown by Fig. 1, that is to say they connect shafts 8, 9 with the engines through Cardan joints 16 and 17, and they diverge toward the rear.

The rear end of shaft 14 is connected, through the intermediate of a Cardan joint 22, with the front end of a shaft 23 disposed in such manner that its rear end is located nearer the vertical plane of symmetry of the fuselage than its front end. This rear end of shaft 23 is then coupled, through a Cardan joint 24, with the shaft of the rear engine 12, which can be nearly in line with the fuselage, owing to the bent transmission line passing on one side of the pilot's seat. This engine 12 can be arranged slightly in oblique in the fuselage (as shown by Fig. 1) in order to reduce the angle of operation of joint 24.

As for transmission shaft 15, it is arranged symmetrically with shaft 14, and in order to transmit the power to its rear end, which is located close to the wall of the fuselage, I make use of a gear device which can be supported by a case rigid with the front engine 13. Thus the front engine 13 can be positioned as centrally as possible with respect to the fuselage, immediately ahead of engine 12. The rear of said engine 13 may be at a greater distance from a vertical plane passing through the center of the rear Cardan joint of shaft 15 and parallel to the vertical plane of symmetry of the fuselage than the front part of said engine 13, in order to obtain an obliquity analogous to that of engine 12.

Thus, owing to the fact that, starting from driving shafts which are at a relatively small distance from each other, the power is transmitted through transmission lines which are spaced apart in their intermediate parts so as to pass around the pilot's seat and finally lead to parallel shafts 8 and 9, it is possible to reduce the cross section of the fuselage to a minimum.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an aircraft fuselage having at least one propeller at the front end thereof, a pilot seat within said fuselage behind said propeller, at least one motor mounted within said fuselage behind said pilot seat, and drive shaft means operably connecting the shafts of said propeller and said motor, said drive shaft means being, in plan view, in the form of a bent line passing to the side of said pilot seat.

2. In an aircraft fuselage having at least one propeller at the front end thereof, a pilot seat within said fuselage behind said propeller, at least one motor mounted within said fuselage behind said pilot seat, and drive shaft means operably connecting the shafts of said propeller and said motor, said drive shaft means being, in plan view, in the form of a bent line passing to the side of said pilot seat at a height less than the height of the shoulders of a pilot seated in said seat and within an elliptical envelope circumscribing the pilot's body.

3. In an aircraft fuselage having two coaxial propellers mounted for turning in opposite rotational driving directions at the front thereof, a pilot seat within said fuselage behind said propellers, two motors mounted within said fuselage behind said pilot seat and arranged one behind the other, and drive shaft means operably connecting the shafts of each of said motors, respectively, with the shaft of one of said propellers, one of said drive shaft means being in the form of a bent line, said drive shaft means passing, respectively, on opposite sides of the pilot seat.

4. In an aircraft fuselage having two coaxial propellers mounted for turning in opposite rotational driving directions at the front thereof, a pilot seat within said fuselage behind said propellers, two motors mounted within said fuselage behind said pilot seat and arranged one behind the other, and drive shaft means operably connecting the shafts of each of said motors, respectively, with the shaft of one of said propellers, one of said drive shaft means being in the form of a bent line, said drive shaft means passing, respectively, on opposite sides of the pilot seat, the drive shaft means connecting the rear motor to its propeller being constituted by at least two shaft sections and an intermediate Cardan joint articulating said sections, the front shaft section being arranged in such a manner that its rear end is further from the vertical plane of symmetry of the fuselage than its front end, the arrangement of the rear section being such that its rear end is nearer to said vertical plane of symmetry than its front end, the shaft of the rear motor being substantially centered within said fuselage.

5. In an aircraft fuselage having two coaxial propellers mounted for turning in opposite rotational driving directions at the front thereof, a pilot seat within said fuselage behind said propellers, two motors mounted within said fuselage behind said pilot seat and arranged one behind the other, and drive shaft means operably connecting the shafts of each of said motors, respectively, with the shaft of one of said propellers, one of said drive shaft means being in the form of bent lines, said drive shaft means passing, respectively, on opposite sides of the pilot seat, the drive shaft means connecting the front motor to its propeller including a first shaft section arranged in such a manner that the front end thereof is nearer the vertical plane of symmetry of the fuselage than its rear end, the shaft of said front motor having a driving gear keyed to the front end thereof, a driven gear in mesh with said driving gear, said driven gear being mounted on said motor farther from the vertical plane of symmetry of said fuselage than said driving gear and having a relatively short forwardly extending second drive shaft section rigid therewith, and an intermediate Cardan joint articulately connecting the front end of said second section with the rear end of said first section.

ETTORE BUGATTI.